United States Patent
DuBois

(10) Patent No.: US 7,726,712 B2
(45) Date of Patent: Jun. 1, 2010

(54) BOX LIFTING DEVICE

(75) Inventor: Dennis DuBois, Las Vegas, NV (US)

(73) Assignee: Primary Ventures, LLC, San Diego, CA (US)

( * ) Notice: Subject to any disclaimer, the term of this patent is extended or adjusted under 35 U.S.C. 154(b) by 0 days.

(21) Appl. No.: 11/463,411

(22) Filed: Aug. 9, 2006

(65) Prior Publication Data

US 2007/0046053 A1    Mar. 1, 2007

Related U.S. Application Data

(63) Continuation-in-part of application No. 11/201,561, filed on Aug. 10, 2005, now Pat. No. 7,237,813.

(51) Int. Cl.
    *B65G 7/12* (2006.01)
(52) U.S. Cl. .......................... 294/15; 294/27.1; 16/422
(58) Field of Classification Search ................. 294/8.6, 294/15, 27.1, 61, 5; 16/422, 425; 229/117.19; 248/206.5
    See application file for complete search history.

(56) References Cited

U.S. PATENT DOCUMENTS

| 430,399 | A | | 6/1890 | O'Dell | |
|---|---|---|---|---|---|
| 1,203,339 | A | * | 10/1916 | Holstein | 294/16 |
| 2,992,466 | A | * | 7/1961 | Gallagher | 24/303 |
| 3,498,661 | A | | 3/1970 | Graziano | |
| 4,226,349 | A | | 10/1980 | Uccellini | |
| 4,525,115 | A | * | 6/1985 | Garner, Sr. | 411/457 |
| 4,577,897 | A | | 3/1986 | Mazac | |
| 4,682,803 | A | | 7/1987 | Andrews | |
| 4,707,011 | A | | 11/1987 | McKim, Jr. | |
| 4,830,322 | A | * | 5/1989 | Gary | 248/206.5 |
| 5,364,143 | A | | 11/1994 | Grady | |
| 5,599,052 | A | * | 2/1997 | Van Davelaar | 294/159 |
| 5,695,165 | A | * | 12/1997 | Moriarty | 248/316.8 |
| 5,895,018 | A | * | 4/1999 | Rielo | 248/206.5 |
| 6,041,717 | A | * | 3/2000 | Kubat | 108/44 |
| 6,082,794 | A | | 7/2000 | Whitney | |
| 6,217,091 | B1 | | 4/2001 | Whitney | |
| 6,422,620 | B1 | | 7/2002 | Jordening | |
| 7,237,813 | B2 | * | 7/2007 | DuBois | 294/15 |

FOREIGN PATENT DOCUMENTS

| JP | 2000-085930 A | 3/2000 |
|---|---|---|
| JP | 2000-211715 A | 8/2000 |
| JP | 2005-104603 A | 4/2005 |

* cited by examiner

*Primary Examiner*—Dean J Kramer
(74) *Attorney, Agent, or Firm*—Fish & Associates

(57) ABSTRACT

A pair of devices for lifting boxes is disclosed. Each device comprises a handle, lifting surface, lifting plate and a plurality of lifting members in the form of angled teeth. During use, the teeth of each device are inserted into opposite sides of a corrugated box. A user is then able to lift the box using the temporary handles. The teeth are angled relative to a bottom edge of the lifting plates allowing a user's wrist to maintain a proper position to lift boxes over the user's head. During non-use the pair of devices they are connected with magnets such that the teeth of each lifting plate are received by corresponding openings in the other lifting plate. Each tooth may also include an extension portion for accommodating portions of a box thereby increasing the surface area of contact between the teeth and the box.

5 Claims, 5 Drawing Sheets

BOX LIFTING DEVICE

CROSS-REFERENCE TO RELATED APPLICATIONS

This application is a continuation-in-part of application Ser. No. 11/201,561 filed Aug. 10, 2005 now U.S. Pat. No. 7,237,813.

FIELD OF THE INVENTION

The embodiments of the present invention relate to a device for lifting corrugated boxes. More particularly, the embodiments relate to a pair of hand held units which partially insert into a box and act as lifting handles.

BACKGROUND

Lifting boxes has long been a tedious and unpleasant endeavor. In particular, large boxes can be cumbersome and difficult to grip and lift. Accordingly, lifting boxes in an improper manner may cause severe back injuries. While there have been attempts to develop means and devices for improving the ease with which one can lift boxes, each of the attempts has suffered drawbacks.

For example, corrugated boxes have incorporated perforated sections which, when necessary, are punched out to act as handles. Unfortunately, the handles tend to fail and can injury unprotected hands. Dollies and straps are also popular in the moving business. However, not everyone has a dolly available. Moreover, dollies can damage flooring and similar surfaces.

Thus, there continues to be the need for a simple device for lifting boxes.

SUMMARY

Accordingly, a first embodiment of the present invention comprises a pair of identical hand-held units each comprising a circular handle connected to a lifting surface. An underside of the lifting surface includes a series of lifting members designed to puncture a corrugated box. In practice, a user first inserts the lifting members into sides of the corrugated box. Then, the user is able to grip the handles and lift the box. Angling the lifting members in an upward direction maintains the box in position during the lifting procedure. Once the box is moved, the lifting members are easily removed. The lifting members are sized to prevent any damage to the contents of the box being lifted.

In a first embodiment, the lifting members are metallic teeth formed in a lifting plate. Points of the teeth are angled upward so that the box does not disengage while it is being lifted. During non-use the lifting plate may be removed, turned over and re-attached to the lifting surface such that the teeth are contained within a cavity in the lifting surface. In this manner, accidental injury is avoided during non-use.

Other features, variations and embodiments will become evident from the detailed description, drawings and claims set forth below.

DETAILED DESCRIPTION

Figure 1:
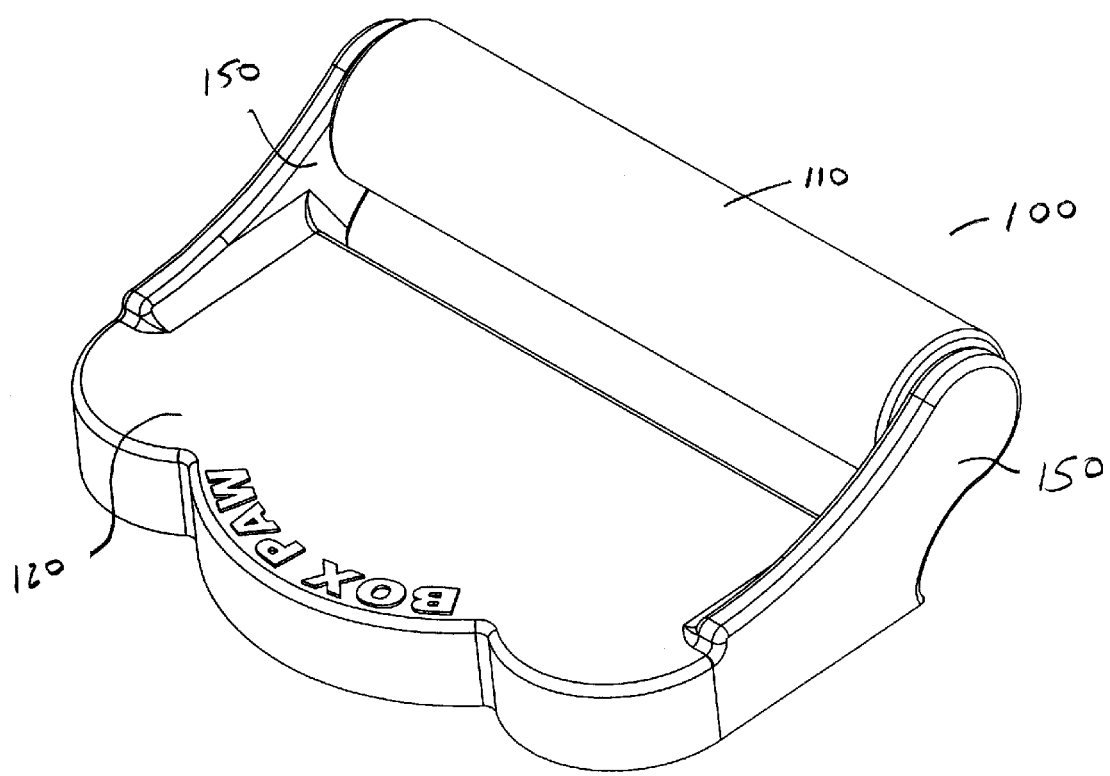
FIG. 1 shows a perspective view of the present invention.

For the purposes of promoting an understanding of the principles in accordance with the embodiments of the present invention, reference will now be made to the embodiments illustrated in the drawings and specific language will be used to describe the same. It will nevertheless be understood that no limitation of the scope of the invention is thereby intended. Any alterations and further modifications of the inventive feature illustrated herein, and any additional applications of the principles of the invention as illustrated herein, which would normally occur to one skilled in the relevant art and having possession of this disclosure, are to be considered within the scope of the invention claimed.

Figure 2:
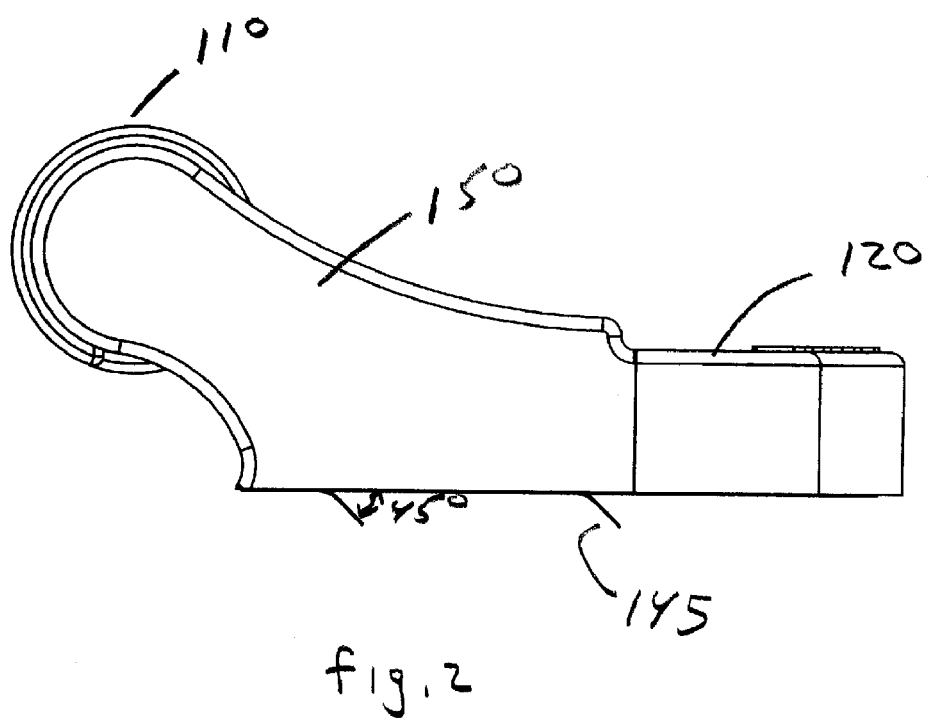
FIG. 2 shows an end view of the present invention.
Figure 3:
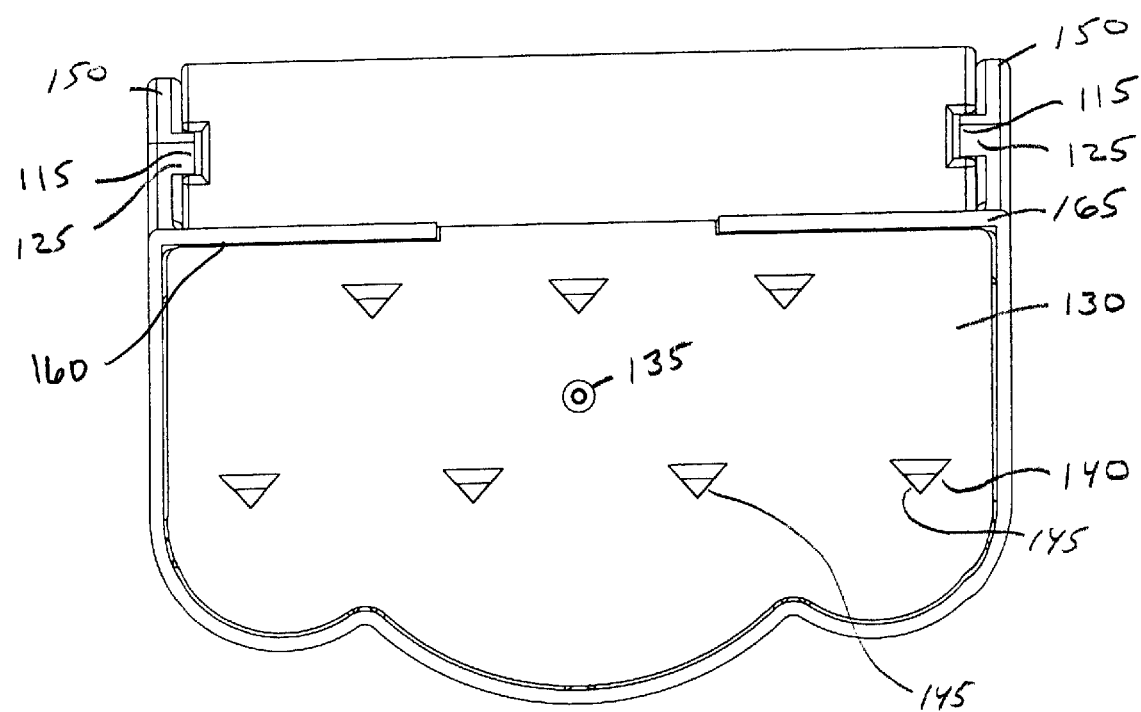
FIG. 3 shows an underside of the present invention.

Reference is now made to the figures wherein like parts are referred to by like numerals throughout. FIGS. 1-3 illustrate a device 100 of a first embodiment of the present invention for lifting boxes. The invention is ideal for lifting corrugated boxes. Corrugated boxes are named for the fluted inner layer called corrugated medium that is sandwiched between layers of linerboard. Corrugated boxes are used extensively in the United States because they are impact, drop and vibration damage resistant while remaining light enough to ship products.

The device 100 comprises a handle 110, lifting surface 120, lifting plate 130 and lifting members 140. Preferably, the handle 110 and lifting surface 120 are fabricated of plastic using injection molding techniques. The handle 110 is joined to the lifting surface 120 by a pair of support members 150.

The handle 110 and lifting surface 120 may be a single unit or the handle 110 may be separate such that it is removable. A removable handle facilitates a simpler manufacturing process. In a removable fashion, the handle 110 includes notches 115 on each end thereof. The notches 115 engage protrusions 125 on inner surfaces of the support members 150. The notches 115 are designed such that the handle 110 may be attached to the support members 150 by twisting the handle 110 into place. Whether the handle 110 is integral or a separate unit, the handle 110 may be coated with a resilient surface (e.g., sponge) to accommodate a user's hands.

In practice, a user inserts the lifting members 140 of a pair of devices 100 into opposite sides of a corrugated box. The user then grips the handles 110 such that the user's thumbs are placed against the handles 110 in a parallel fashion along a top of the handles 110 and the user's fingers are curled up against a bottom portion of the handles 110. Then, the user simply applies upward pressure which secures the lifting members within the inner fluted layer of the corrugated box such that the box may be lifted.

Figure 4:
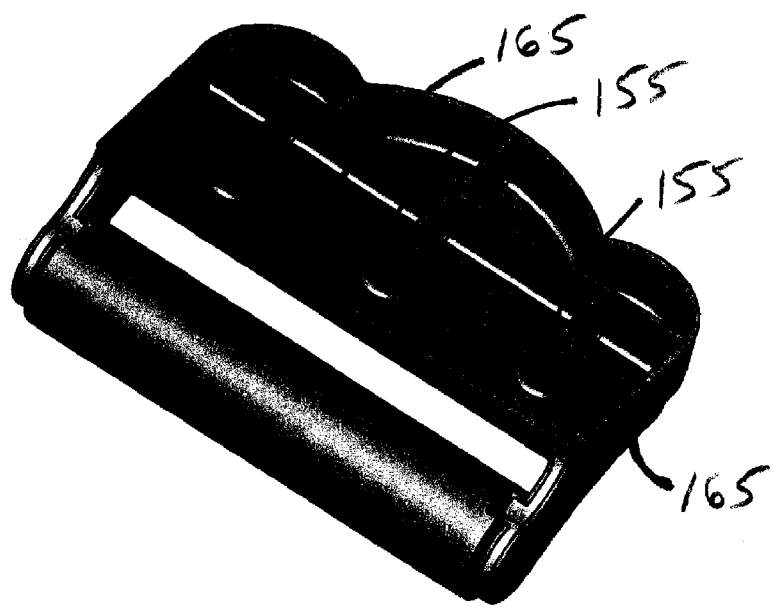
FIG. 4 shows an underside of the present invention with a lifting plate removed.

Ideally, the lifting plate 130 is fabricated of a metallic member. In one embodiment, the lifting plate 130 is stamped in a machine press whereby the lifting members 140 in the form of teeth 145 are punched out of the metallic member forming the lifting plate 130. As shown in FIG. 3, the lifting plate 130 also incorporates multiple apertures 135 for the insertion of removable fasteners (e.g., screws). The position of the apertures 135 correspond to fastener inlets 155 integrated on an underside of the lifting surface 120. To demonstrate that multiple configurations are possible, FIG. 3 shows a single aperture 135 in the lifting plate 130 while FIG. 4 shows three inlets 155. Accordingly, the plate 130 shown in FIG. 3 is not the appropriate lifting plate 130 for the lifting device 100 shown in FIG. 4. In the proper arrangement, during non-use, the lifting plate 130 may be removed and re-attached in an opposite orientation such that the teeth 145 are contained within a cavity 165 defined by an underside of the lifting surface 120. Therefore, accidental injuries which might be caused by the teeth 145 are eliminated.

In an alternative embodiment, a bottom edge 160 the lifting plate 130 rests in a channel (not shown) on a bottom edge 165 of the lifting surface 120 and is then removably attached with a single centrally positioned fastener (e.g., screw) as shown in FIG. 3.

Although the teeth 145 may be angled differently, the inventor has found that a 45° angle between the teeth 145 and lifting plate 130 is ideal for maintaining the box during the lifting process. The upward angle provides increased surface area for contact with the box. In this configuration, the large surface area of the plurality of teeth 145 contacts the box and accommodates the weight of the box and contents. The increased surface area prevents the teeth from 145 from ripping through the box during use.

Figure 5A:
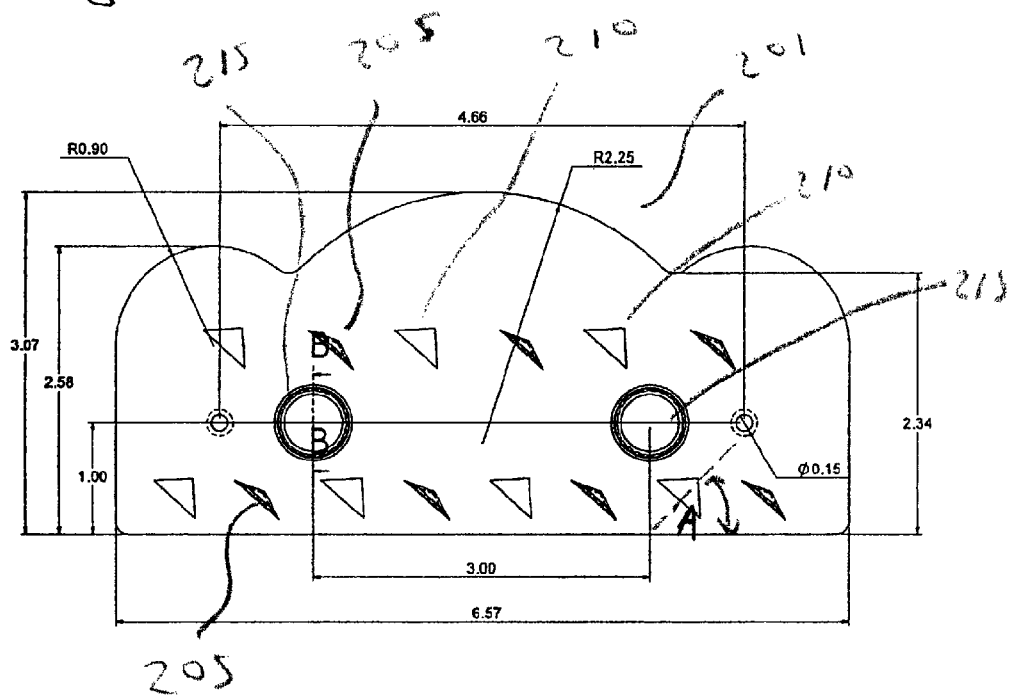
FIGS. 5a and 5b show alternative lifting plates, namely a left and right lifting plate, respectively.
Figure 5B:
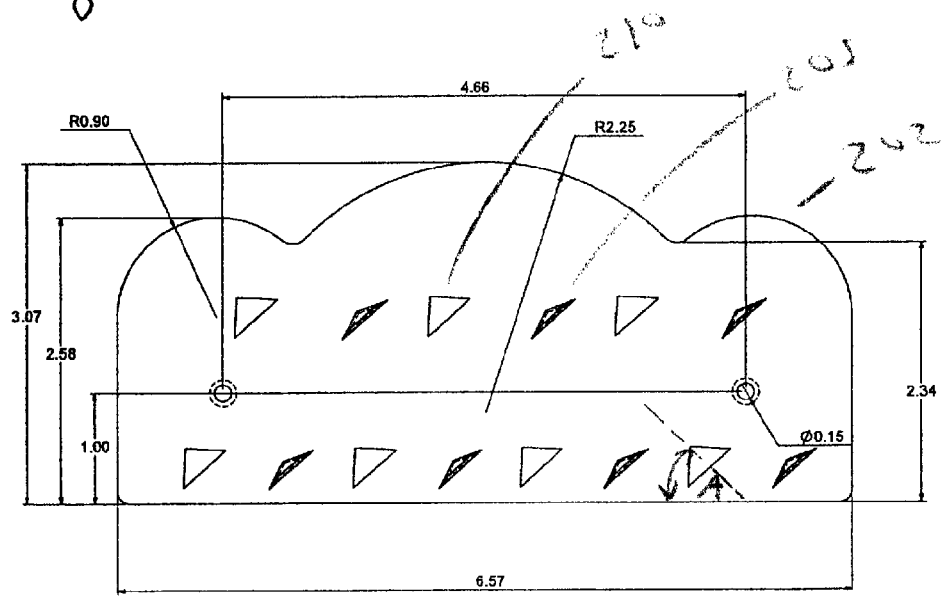

Alternative lifting plates 201, 202 are shown in FIGS. 5a and 5b. With the alternative lifting plates 201, 202, lifting teeth 205 are directed at an acute angle (A) relative to a bottom edge 160 of the lifting plate 201, 202 for purposes disclosed below. In such a configuration, a sharp point 206 of each lifting tooth 205 is directed at angle (A) relative to the bottom edge 160 of the lifting plate 201, 202. For purposes of clarity, the teeth 145 of the embodiment described above are perpendicular to the bottom edge 160 of the device 100 such that the sharp points are directed at 90 degrees to the bottom edge 160. The alternative lifting plates 201, 202 each further include a series of strategically placed openings 210.

By angling the teeth 205, as shown in FIGS. 5a and 5b, a user grips a box with the angled teeth 205 directed upward such that the handles 110 are also angled allowing the user to more easily lift a box above the user's head to place it on a shelf or other desired, elevated location. In the first embodiment, the teeth 145 are vertically positioned such that the handles 110 are horizontal when the devices 100 are used to grip a box. The horizontal position does not facilitate lifting boxes above a user's head because the user's wrist must bend uncomfortably and the box tends to fall into the user. With angled lifting teeth 205, during use the angled teeth 205 and handles 110 are at a similar angle when gripping and lifting a box such that the user's wrist are maintained automatically in the proper position for lifting boxes above the user's head for placement on shelves and the like. Consequently, in this embodiment there is a left and right lifting plate 201, 202 (and left and right device 100) that are ideally identified for the user. For example, the lifting plates 201, 202 may include printed arrows indicating the lifting direction such that the left and right units are apparent to users.

Lifting plate 202 also incorporates a pair of magnets 215. The magnets 215 are operable to connect a pair of the devices 100 during non-use and for storage. The openings 210 in the left and right lifting plates 201, 202 correspond to a position of the lifting teeth 205 in the opposite lifting plate 201, 202. Therefore, the left and right device 100 may be connected to one another—lifting plate 201 to lifting plate 202—by the magnets 215 and such that the teeth 205 in the left lifting plate 201 enter the openings 210 in the right lifting plate 202 and vice versa. This configuration keeps the teeth 205 concealed during non-use and creates a small and convenient package for storage.

Figure 6A:
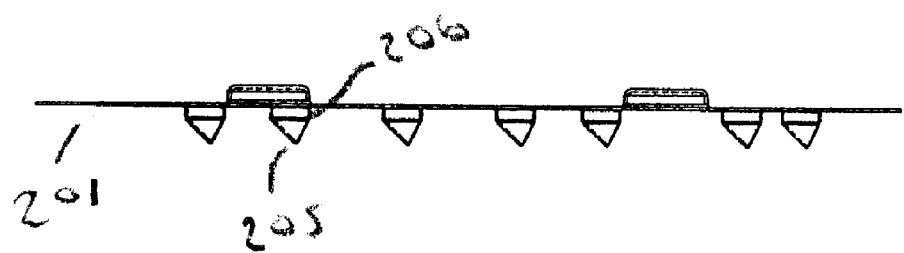
FIGS. 6a and 6b show a top view of the left and right lifting plates of FIGS. 5a and 5b, respectively.
Figure 6B:
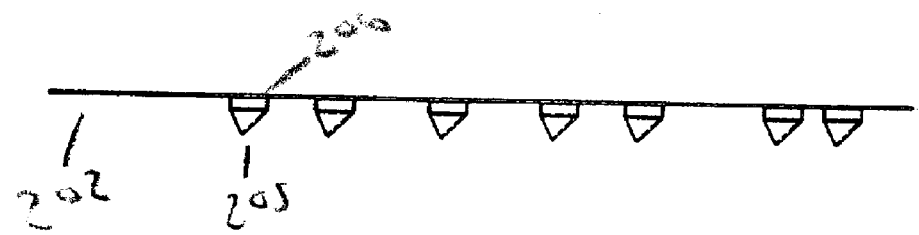

FIGS. 6a and 6b show a top view of the left and right lifting plates 201, 202. As shown, the lifting teeth 205 include an extension portion 206. The extension portion 206 accommodates a portion of the subject box creating additional surface area contact between the teeth 205 and the box. The extension portion 206 acts like a shelf for portions of the box to rest on while being lifted.

Although the invention has been described in detail with reference to several embodiments, additional variations and modifications exist within the scope and spirit of the invention as described and defined in the following claims.

I claim:

1. A pair of devices for lifting a box, comprising:
   a first one of the pair having a lifting surface, a handle coupled to the lifting surface, wherein the handle is offset from the lifting surface such that at least a portion of a user's wrist contacts the lifting surface when used in conjunction with a second one of the pair to lift the box above the user's head;
   a plurality of first lifting members disposed on a first lifting plate to insert into a first side of the box when lifting the box;
   the second one of the pair having a plurality of second lifting members disposed on a second lifting plate to insert into an opposing side of the box when lifting the box;
   wherein some of the lifting members have sharp points, and at least some of the sharp points are directed at an acute angle A relative to a bottom edge of the lifting plate, not at an angle relative to the surface of the lifting plate; and
   at least one of the devices including a magnet operable to separably couple the pair of devices, and wherein each of the lifting plates includes openings for receipt of the plurality of lifting members of the other device.

2. The pair of devices of claim 1 wherein at least some of the lifting members comprise punched out teeth.

3. The pair of devices of claim 1, wherein at least some of the lifting members include an extension portion.

4. The pair of devices of claim 1, wherein at least some of the lifting members extend from a removable lifting plate.

5. The pair of devices of claim 1, wherein the acute angle A is 45°.

* * * * *